United States Patent
Ma

(10) Patent No.: US 11,606,023 B2
(45) Date of Patent: Mar. 14, 2023

(54) DISCHARGE DEVICE FOR DISCHARGING INTERNAL POWER OF ELECTRONIC DEVICE

(71) Applicant: Winbond Electronics Corp., Taichung (TW)

(72) Inventor: Ying-Ting Ma, Taichung (TW)

(73) Assignee: Winbond Electronics Corp., Taichung (TW)

( * ) Notice: Subject to any disclaimer, the term of this patent is extended or adjusted under 35 U.S.C. 154(b) by 194 days.

(21) Appl. No.: 17/065,528

(22) Filed: Oct. 8, 2020

(65) Prior Publication Data

US 2022/0115944 A1 Apr. 14, 2022

(51) Int. Cl.
*H02M 1/32* (2007.01)
*H02M 3/156* (2006.01)

(52) U.S. Cl.
CPC ............ *H02M 1/32* (2013.01); *H02M 3/156* (2013.01)

(58) Field of Classification Search
CPC ......... H02M 1/32; H02M 3/156; H02M 1/322
USPC ........................................................ 323/282
See application file for complete search history.

(56) References Cited

U.S. PATENT DOCUMENTS

| 5,572,735 | A * | 11/1996 | Tanikawa | G06F 1/3265 |
| | | | | 713/300 |
| 6,590,442 | B2 * | 7/2003 | Byeon | G11C 5/145 |
| | | | | 327/535 |
| 7,012,456 | B1 * | 3/2006 | Hirose | H03K 17/162 |
| | | | | 327/546 |
| 7,154,309 | B1 * | 12/2006 | Talbot | H03K 17/08122 |
| | | | | 327/108 |
| 2008/0143430 | A1 * | 6/2008 | Chen | H03K 17/6872 |
| | | | | 327/543 |
| 2010/0301921 | A1 * | 12/2010 | Isohata | H03K 17/166 |
| | | | | 327/365 |
| 2011/0012888 | A1 * | 1/2011 | Ko | G09G 3/3648 |
| | | | | 345/212 |
| 2012/0099392 | A1 * | 4/2012 | Shim | G11C 5/147 |
| | | | | 365/226 |
| 2013/0126320 | A1 * | 5/2013 | Kim | H01H 3/503 |
| | | | | 200/33 R |
| 2015/0130533 | A1 * | 5/2015 | Jeon | G11C 5/147 |
| | | | | 327/540 |

(Continued)

OTHER PUBLICATIONS

Received STIC search report from EIC 2800 searcher Salim Alam for claim 1 on Oct. 28, 2021. (Year: 2021).*

*Primary Examiner* — Shawki S Ismail
*Assistant Examiner* — Htet Z Kyaw
(74) *Attorney, Agent, or Firm* — JCIPRNET

(57) ABSTRACT

A discharge device is provided. The discharge device discharges an internal power of an electronic device. The discharge device includes a voltage regulation circuit, a charge storage circuit, a control signal generator and a discharge path. The voltage regulation circuit regulates the internal power to a regulated power. The charge storage circuit stores the regulated power. The control signal generator is configured to receive the regulated power and an external power, enabled according to the regulated power, and generating a control signal in response to a voltage level of the external power. The discharge path is configured to receive the internal power, and turned on according to the control signal to discharge the internal power.

10 Claims, 5 Drawing Sheets

(56) References Cited

U.S. PATENT DOCUMENTS

| | | | |
|---|---|---|---|
| 2015/0188600 A1* | 7/2015 | Kang | H03K 17/687 |
| | | | 327/437 |
| 2015/0229296 A1* | 8/2015 | Kim | G11C 11/40611 |
| | | | 327/108 |
| 2017/0062056 A1* | 3/2017 | Park | G11C 5/148 |
| 2019/0173306 A1* | 6/2019 | Chang | H02J 7/0068 |
| 2019/0245530 A1* | 8/2019 | Roy | H03K 17/687 |
| 2020/0098740 A1* | 3/2020 | Huang | H02H 9/046 |
| 2020/0244156 A1* | 7/2020 | Cao | H02M 1/32 |
| 2021/0021148 A1* | 1/2021 | Kudo | H02J 50/05 |
| 2021/0143730 A1* | 5/2021 | Yang | H02M 3/33507 |
| 2021/0375331 A1* | 12/2021 | Kim | G11C 16/30 |
| 2021/0399687 A1* | 12/2021 | Shido | H03F 3/4521 |
| 2022/0171416 A1* | 6/2022 | Tai | G05F 1/468 |

* cited by examiner

DISCHARGE DEVICE FOR DISCHARGING INTERNAL POWER OF ELECTRONIC DEVICE

TECHNICAL FIELD

The invention relates to a discharge device, and more particularly, to a discharge device that discharges an electronic device according to an external power.

BACKGROUND

In general, the electronic device will be disabled based on a specific power off procedure. However, the external power is controlled by the client, and the manufacturer cannot predict how the client will use it. Once the client violates the power off procedure, it may cause an internal power to be at an unexpected voltage level.

For instance, referring to FIG. 1, FIG. 1 is a power timing diagram of an example of violation of the power off procedure. An external power VDD is controlled by the client. In the case where a timing of the external power VDD does not meet a timing of the power off procedure, when the external power VDD is lowered to a low voltage level, a voltage level of an internal power VPP of the electronic device will not be lowered to the low voltage level in time. Once the internal voltage cannot be discharged to the low voltage level as expected, it may cause unexpected errors in internal circuits of the electronic device.

SUMMARY

The invention provides a discharge device that can effectively discharge the internal power of the electronic device to the low voltage level.

The discharge device of the invention is configured to discharge an internal power of an electronic device. The discharge device includes a voltage regulation circuit, a charge storage circuit, a control signal generator and a discharge path. The voltage regulation circuit is configured to receive the internal power and regulate the internal power to a regulated power. The charge storage circuit is coupled to the voltage regulation circuit. The charge storage circuit is configured to store the regulated power. The control signal generator is coupled to the voltage regulation circuit and the control signal generator. The control signal generator is configured to receive the regulated power and an external power, enabled according to the regulated power, and generating a control signal in response to a voltage level of the external power. The discharge path is coupled to the control signal generator. The discharge path is configured to receive the internal power, and turned on according to the control signal to discharge the internal power.

Based on the above, the discharge device of the invention generates the control signal in response to the voltage level of the external power, and turns on the discharge path according to the control signal so as to discharge the internal power. In this way, with use of the external power, the discharge device of the invention can effectively discharge the internal power of the electronic device to the low voltage level.

To make the aforementioned more comprehensible, several embodiments accompanied with drawings are described in detail as follows.

DESCRIPTION OF THE EMBODIMENTS

Figure 1:
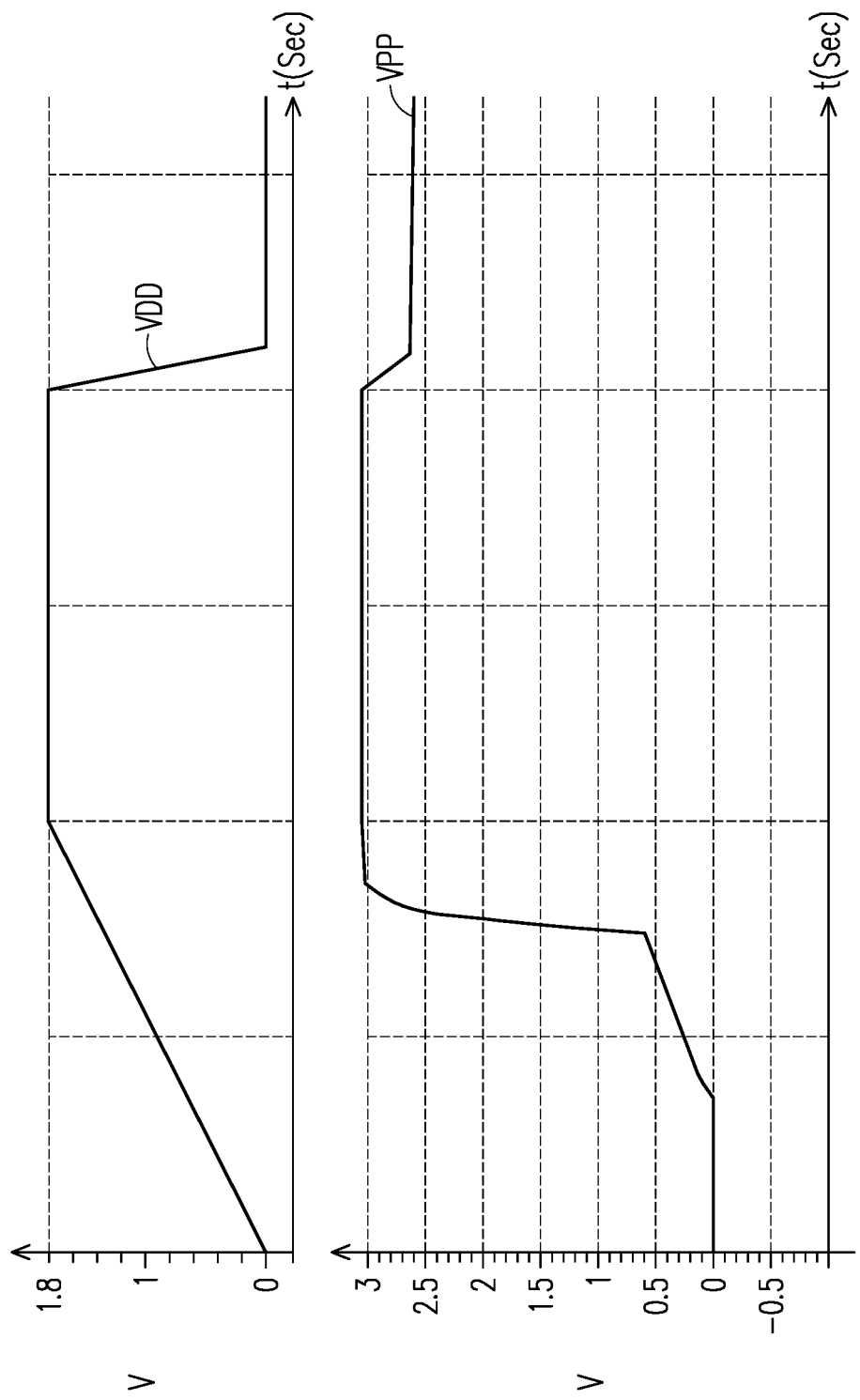
FIG. 1 is a power timing diagram of an example of violation of the power off procedure.
Figure 2:
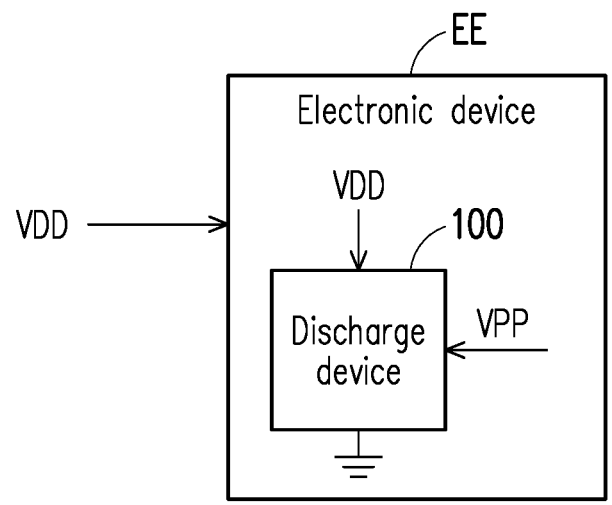
FIG. 2 is a schematic configuration diagram of an electronic device and a discharge device illustrated according to an embodiment of the invention.

Referring to FIG. 2, FIG. 2 is a schematic configuration diagram of an electronic device and a discharge device illustrated according to an embodiment of the invention. In this embodiment, an electronic device EE can be enabled according to the external power VDD to generate the internal power VPP. A discharge device 100 discharges the internal power VPP of the electronic device EE. Further, the discharge device 100 and the electronic device EE commonly receive the external power VDD. The discharge device 100 discharges the internal power VPP of the electronic device EE according to a voltage level of the external power VDD. In this embodiment, the electronic device EE may be a memory device, a mobile phone, a tablet computer, a notebook computer, a desktop computer, etc. In this embodiment, the discharge device 100 is disposed inside the electronic device EE, but the invention is not limited thereto. In some embodiments, the discharge device 100 may be disposed outside the electronic device EE.

Figure 3:
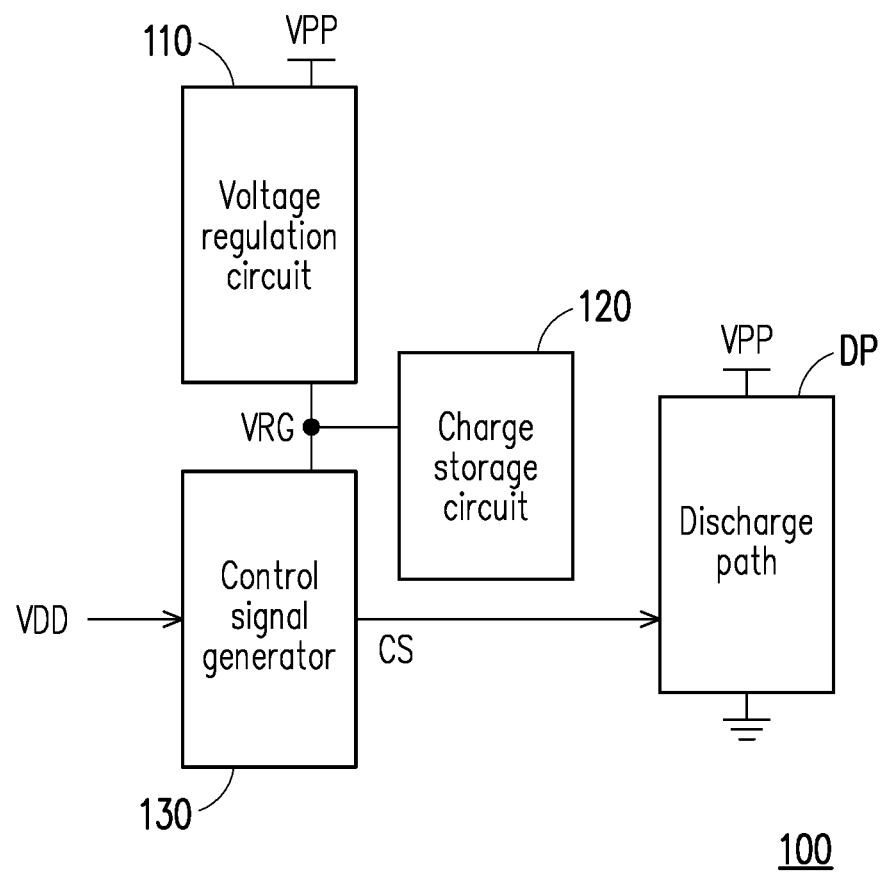
FIG. 3 is a schematic device diagram of a discharge device illustrated according to an embodiment of the invention.

Referring to FIG. 2 and FIG. 3 together, FIG. 3 is a schematic device diagram of a discharge device illustrated according to an embodiment of the invention. In this embodiment, the discharge device 100 includes a voltage regulation circuit 110, a charge storage circuit 120, a control signal generator 130 and a discharge path DP. The voltage regulation circuit 110 receives the internal power VPP and regulates the internal power VPP to a regulated power VRG. The charge storage circuit 120 is coupled to the voltage regulation circuit 110. The charge storage circuit 120 stores the regulated power VRG from the voltage regulation circuit 110. The control signal generator 130 is coupled to the voltage regulation circuit 110 and the control signal generator 120. The control signal generator 130 receives the regulated power VRG and the external power VDD. The control signal generator 130 is enabled according to the regulated power VRG, and generates a control signal CS in response to the voltage level of the external power VDD. The discharge path DP is coupled to the control signal generator 130. The discharge path DP receives the internal power VPP, and is turned on according to the control signal CS from the control signal generator 130 to discharge the internal power VPP.

For instance, the control signal generator 130 generates the control signal CS having a low voltage level when the voltage level of the external power VDD is at a high voltage level. The discharge path DP is then cut off according to the control signal CS having the low voltage level. Therefore, the discharge device 100 does not discharge the internal power VPP. On the other hand, the control signal generator 130 generates the control signal CS having the high voltage level when the voltage level of the internal power VPP is at the low voltage level. The discharge path DP is then turned on according to the control signal CS having the high voltage level. Therefore, the discharge device 100 discharges the internal power VPP.

Here, it is worth mentioning that, the discharge device 100 generates the control signal CS in response to the voltage level of the external power VDD, and turns on the discharge path DP according to the control signal CS so as to discharge the internal power VPP. In this way, the discharge device 100 can effectively discharge the voltage level of the internal power VPP of the electronic device EE to the low voltage level (e.g., 0V) by the external power VDD.

In this embodiment, because the internal power VPP is discharged, the voltage level of the internal power VPP will be lowered. When the voltage level of the internal power VPP is lower than a voltage level of the regulated power VRG, the voltage regulation circuit 110 is unable to provide the regulated power VRG. The control signal generator 130 can be enabled by the regulated power VRG stored in the charge storage circuit 120. In this way, an enabling time of the control signal generator 130 can be extended, thereby ensuring that the voltage level of the internal power VPP is effectively discharged to the low voltage level.

Figure 4:
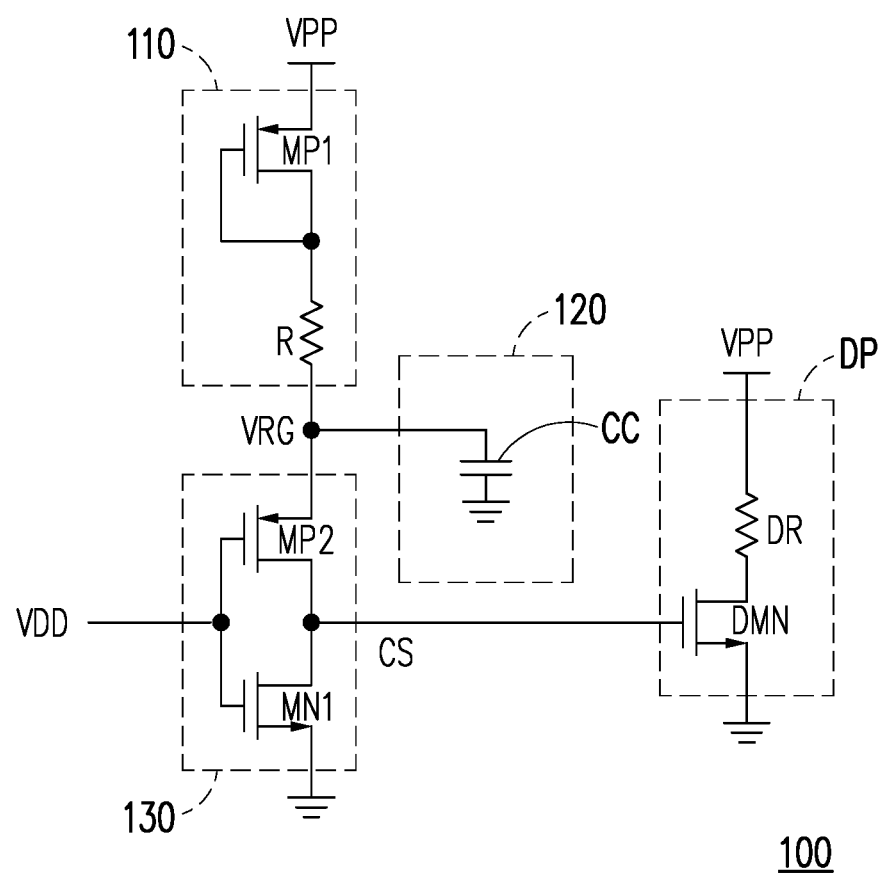
FIG. 4 is a schematic circuit diagram of a discharge device illustrated according to an embodiment of the invention.

Referring to FIG. 4, FIG. 4 is a schematic circuit diagram of a discharge device illustrated according to an embodiment of the invention. In this embodiment, the voltage regulation circuit 110 includes a regulation transistor MP1 and a current-limiting resistor R. A first terminal of the regulation transistor MP1 is configured to receive the internal power VPP. A control terminal of the regulation transistor MP1 is coupled to a second terminal of the regulation transistor MP1. The second terminal of the regulation transistor MP1 is configured to provide the regulated power VRG. The regulation transistor MP1 regulates the internal power VPP to the regulated power VRG. The voltage level of the regulated power VRG will be lower than the voltage level of the internal power VPP. In this embodiment, the regulation transistor MP1 is implemented by, for example, a P-type MOSFET (Metal-Oxide-Semiconductor Field-Effect Transistor). The current-limiting resistor R is coupled between the second terminal of the regulation transistor MP1 and the control signal generator 130. For instance, a first terminal of the current-limiting resistor R is coupled to the second terminal of the regulation transistor MP1. The first terminal of the current-limiting resistor R is coupled to control signal generator 130. The current-limiting resistor R regulates a value of current flowing through the voltage regulation circuit 110, so as to prevent the voltage regulation circuit 110 from being damaged by a high current. In this embodiment, the charge storage circuit 120 includes a capacitor CC. A first terminal of the capacitor CC is coupled to the current-limiting resistor R. A second terminal of the capacitor CC is coupled to a reference low potential (e.g., to be grounded). The charge storage circuit 120 stores the regulated power VRG by the capacitor CC.

Whether the current-limiting resistor R is disposed or not can be selected based on a specification of the internal power VPP. In some embodiments, it is possible that the voltage regulation circuit 110 does not include the current-limiting resistor R based on the internal power VPP with a lower power. The first terminal of the capacitor CC is coupled to the second terminal of the regulation transistor MP1.

In this embodiment, the control signal generator 130 is implemented by a phase inverting circuit, and generates the control signal CS by inverting the external power VDD. For instance, the control signal generator 130 includes a P-type field-effect transistor MP2 and an N-type field-effect transistor MN1. A first terminal of the P-type field-effect transistor MP2 is configured to receive the regulated power VRG. A first terminal of the N-type field-effect transistor MN1 is coupled to a second terminal of the P-type field-effect transistor MP2. A control terminal of the N-type field-effect transistor MN1 and a control terminal of the P-type field-effect transistor MP2 commonly receive the external power VDD. A second terminal of the N-type field-effect transistor MN1 is coupled to the reference low potential. In this embodiment, the first terminal of the N-type field-effect transistor MN1 and the second terminal of the P-type field-effect transistor MP2 are commonly used as an output terminal of the control signal generator 130.

In this embodiment, the discharge path DP includes a discharge transistor DMN. A first terminal of the discharge transistor DMN is configured to receive the internal power VPP. A control terminal of the discharge transistor DMN is coupled to the control signal generator 130. A second terminal of the discharge transistor DMN is coupled to the reference low potential. In this embodiment, the discharge transistor DMN is implemented by, for example, an N-type MOSFET. The control signal generator 130 generates the control signal CS having the low voltage level when the voltage level of the external power VDD is at the high voltage level. The discharge transistor DMN is then cut off according to the control signal CS having the low voltage level. Therefore, the discharge path DP does not discharge the internal power VPP. On the other hand, the control signal generator 130 generates the control signal CS having the high voltage level when the voltage level of the internal power VPP is at the low voltage level. The discharge transistor DMN is then turned on according to the control signal CS having the high voltage level. Therefore, the discharge path DP discharges the internal power VPP.

In this embodiment, the discharge path DP further includes a discharge path DR. The discharge resistor DR is coupled in series with the discharge transistor DMN. A first terminal of the discharge transistor DMN is configured to receive the internal power VPP via the discharge resistor DR. Whether the current-limiting resistor R is disposed with the discharge resistor DR or not can be selected based on the specification of the internal power VPP. In some embodiments, it is possible that the discharge path DP does not include the discharge resistor DR based on the internal power VPP with the lower power.

Figure 5:
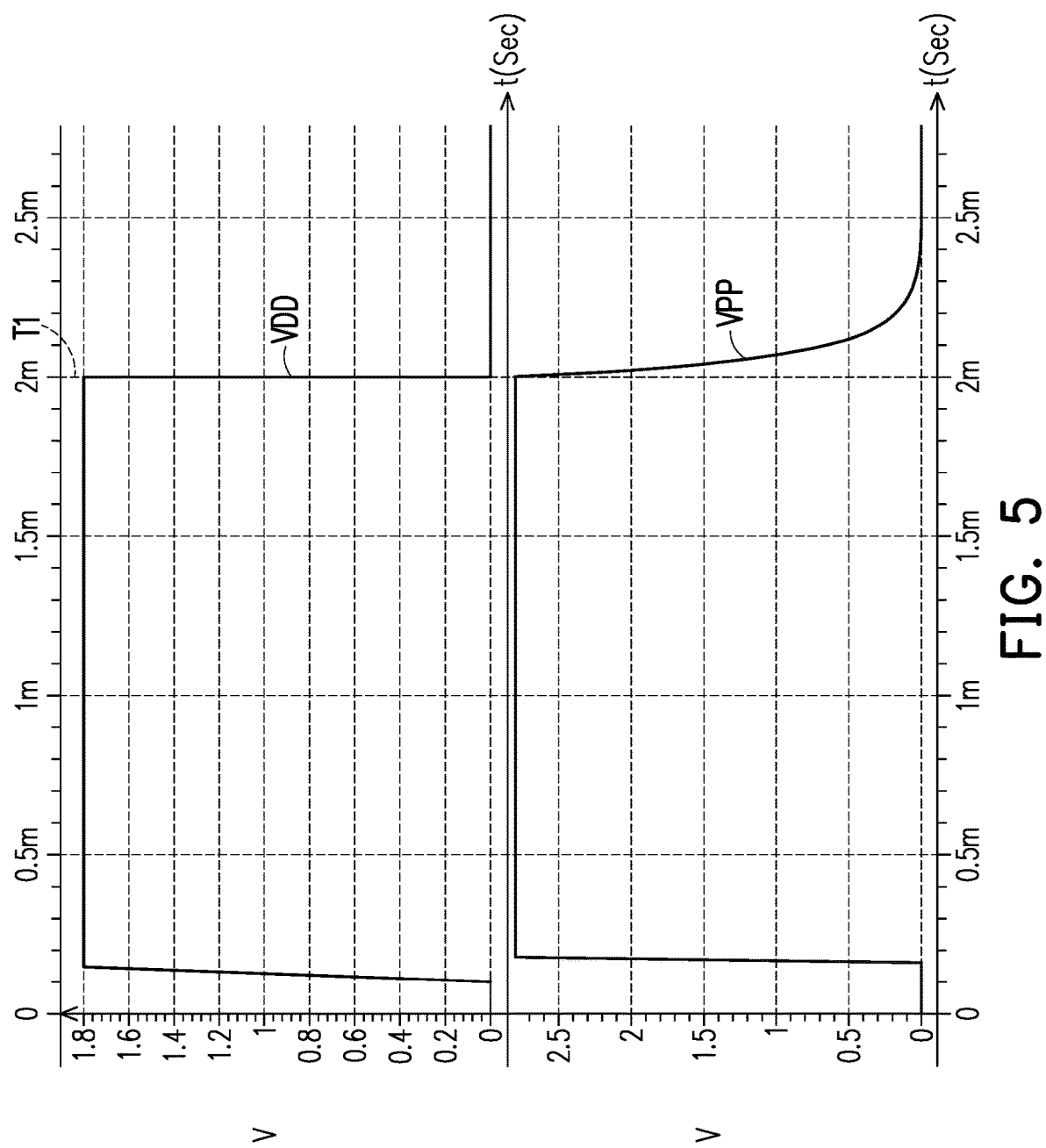
FIG. 5 is a power timing diagram illustrated according to an embodiment of the invention.
Figure 6:
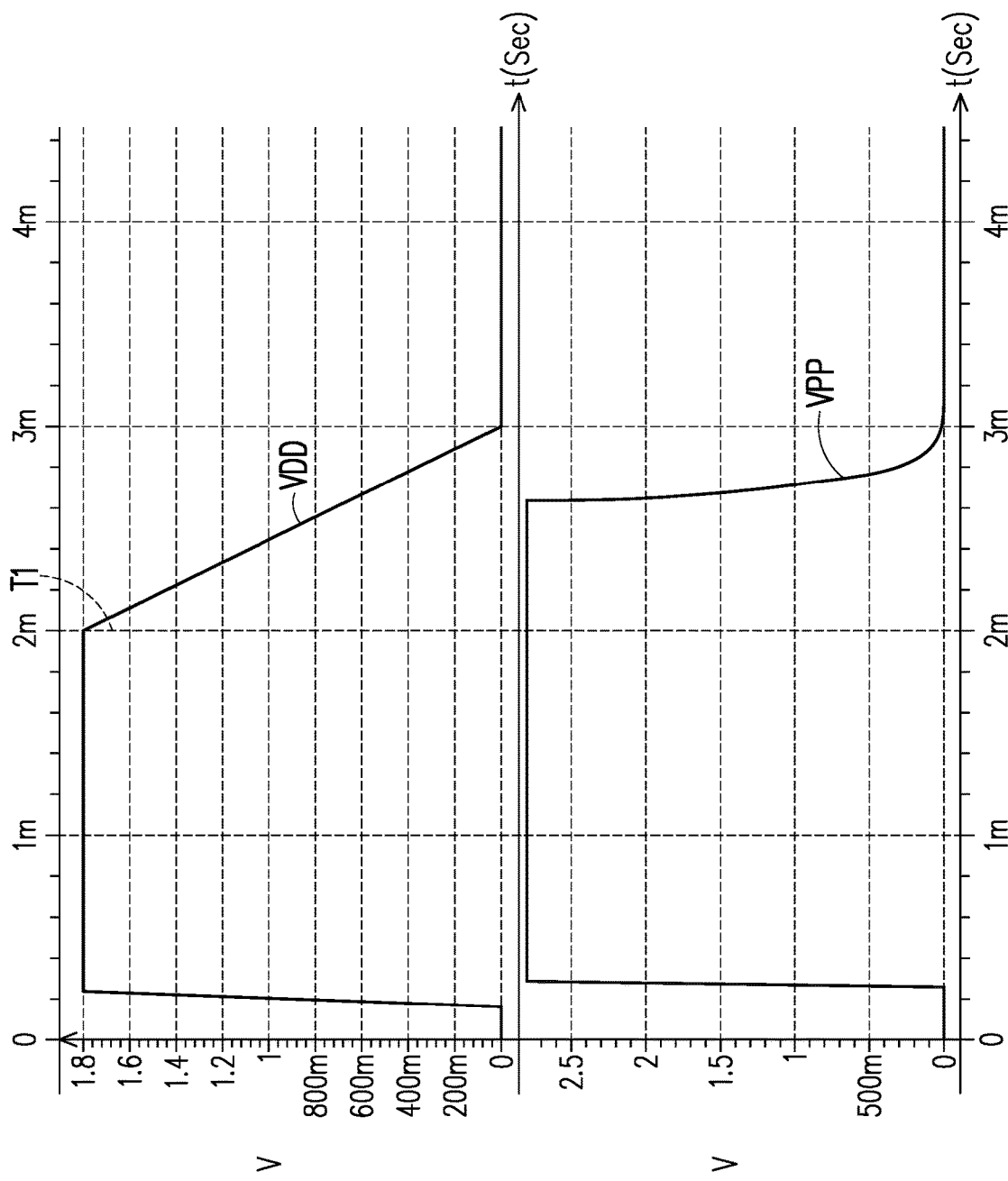
FIG. 6 is a power timing diagram illustrated according to another embodiment of the invention.

Referring to FIG. 3, FIG. 5 and FIG. 6 together, FIG. 5 is a power timing diagram illustrated according to an embodiment of the invention. FIG. 6 is a power timing diagram illustrated according to another embodiment of the invention. In FIG. 5, the voltage level of the external power VDD starts to be lowered from 1.8V at a time point T1, and is lowered to 0V after 0.1 micro second. The voltage level of the internal power VPP will be lowered from 2.8V to 0V after the time point T1. In FIG. 6, the voltage level of the external power VDD starts to be lowered from 1.8V at a time point T1, and is lowered to 0V after 1 mini second. The slew rate of the external power VDD in FIG. 6 is much smaller than that in FIG. 5. The voltage level of the internal power VPP will be lowered from 2.8V to 0V after the time point T1. Because the regulated power VRG can be continuously provided, the discharge device 100 can operate normally under the different slew rates of the external power VDD to discharge the voltage level of the internal power VPP to 0V. In other words, the discharge device 100 can discharge the internal power VPP of the electronic device based on different power off procedures, so as to reduce the voltage level of the internal power VPP to the low voltage level.

In summary, the discharge device of the invention generates the control signal in response to the voltage level of the external power, and turns on the discharge path according to the control signal so as to discharge the internal power. As a result, based on the voltage level of the external power, the discharge device of the invention can effectively discharge the internal power of the electronic device to the low voltage level. Moreover, since the regulated power is continuously provided, the discharge device can operate normally under the different slew rates of the external power.

What is claimed is:

1. A discharge device for discharging an internal power of an electronic device, wherein the discharge device comprises:
   a voltage regulation circuit, configured to receive the internal power and regulate the internal power to a regulated power;
   a charge storage circuit, coupled to the voltage regulation circuit, and configured to store the regulated power;
   a control signal generator, coupled to the voltage regulation circuit and the charge storage circuit, configured to receive the regulated power and an external, power directly, enabled according to the regulated power, and generating a control signal in response to a voltage level of the external power, wherein the electronic device is enabled by the external power to generate the internal power; and
   a discharge path, coupled to the control signal generator, configured to receive the internal power, and turned on according to the control signal to discharge the internal power.

2. The discharge device of claim 1, wherein
   the control signal generator generates the control signal having a low voltage level when the voltage level of the external power is at a high voltage level, and
   the control signal generator generates the control signal having the high voltage level when the voltage level of the external power is at the low voltage level.

3. The discharge device of claim 1, wherein the control signal generator is enabled according to the regulated power stored by the charge storage circuit when a voltage level of the internal power is lower than a voltage level of the regulated power.

4. The discharge device of claim 1, wherein the voltage regulation circuit comprises:
   a regulation transistor, a first terminal of the regulation transistor being configured to receive the internal power, a control terminal of the regulation transistor being coupled to a second terminal of the regulation transistor, the second terminal of the regulation transistor being configured to provide the regulated power.

5. The discharge device of claim 4, wherein the charge storage circuit comprises:
   a capacitor, a first terminal of the capacitor being coupled to the second terminal of the regulation transistor, a second terminal of the capacitor being coupled to a reference low potential.

6. The discharge device of claim 4, wherein the charge storage circuit further comprises:
   a current-limiting resistor, coupled between the second terminal of the regulation transistor and the control signal generator.

7. The discharge device of claim 1, wherein the control signal generator generates the control signal by inverting the external power.

8. The discharge device of claim 7, wherein the control signal generator comprises:
   a P-type field-effect transistor, a first terminal of the P-type field-effect transistor being configured to receive the regulated power; and
   an N-type field-effect transistor, a first terminal of the N-type field-effect transistor being coupled to a second terminal of the P-type field-effect transistor, a control terminal of the N-type field-effect transistor and a control terminal of the P-type field-effect transistor commonly receiving the external power, a second terminal of the N-type field-effect transistor being coupled to a reference low potential, the first terminal of the N-type field-effect transistor and the second terminal of the P-type field-effect transistor being commonly used as an output terminal of the control signal generator.

9. The discharge device of claim 1, wherein the discharge path comprises:
   a discharge transistor, a first terminal of the discharge transistor being configured to receive the internal power, a control terminal of the discharge transistor being coupled to the control signal generator, a second terminal of the discharge transistor being coupled to a reference low potential.

10. The discharge device of claim 1, wherein the discharge path further comprises:
    a discharge resistor, wherein a first terminal of a discharge transistor is configured to receive the internal power via the discharge resistor.

* * * * *